US00RE43170E

(19) United States
(12) Reissued Patent
Undasan

(10) Patent Number: US RE43,170 E
(45) Date of Reissued Patent: Feb. 7, 2012

(54) PREVIEWING DOCUMENTS ON A COMPUTER SYSTEM

(75) Inventor: Renaldo V. Undasan, Epsom (GB)

(73) Assignee: Koninklijke Philips Electronics N.V., Eindhoven (NL)

(21) Appl. No.: 12/582,805

(22) Filed: Oct. 21, 2009

Related U.S. Patent Documents

Reissue of:
(64) Patent No.: 7,490,288
Issued: Feb. 10, 2009
Appl. No.: 10/507,341
PCT Filed: Feb. 6, 2003
PCT No.: PCT/IB03/00422
§ 371 (c)(1),
(2), (4) Date: Sep. 10, 2004
PCT Pub. No.: WO03/079133
PCT Pub. Date: Sep. 25, 2003

(51) Int. Cl.
*G06F 17/00* (2006.01)
*G06F 17/20* (2006.01)

(52) U.S. Cl. ..... 715/201; 715/200; 715/500; 715/501; 715/767; 715/781

(58) Field of Classification Search ..... 715/767, 715/200, 201, 500, 501, 781
See application file for complete search history.

(56) References Cited

U.S. PATENT DOCUMENTS 5,572,643 A * 11/1996 Judson ..... 709/218
5,640,580 A * 6/1997 Slayden et al. ..... 715/209
5,652,901 A * 7/1997 Slayden et al. ..... 715/209
5,680,629 A * 10/1997 Slayden et al. ..... 715/209
5,682,541 A * 10/1997 Martin ..... 715/200
5,724,595 A * 3/1998 Gentner ..... 715/206
5,903,905 A * 5/1999 Andersen et al. ..... 715/275
5,933,142 A * 8/1999 LaStrange et al. ..... 715/788
5,946,412 A * 8/1999 Nishikawa ..... 382/162
6,097,389 A * 8/2000 Morris et al. ..... 715/804
6,118,493 A * 9/2000 Duhault et al. ..... 348/564
6,160,554 A * 12/2000 Krause ..... 715/804
6,177,936 B1 * 1/2001 Cragun ..... 715/760
6,222,545 B1 * 4/2001 Suzuki et al. ..... 345/418
6,313,855 B1 * 11/2001 Shuping et al. ..... 715/854
6,725,425 B1 * 4/2004 Rajan et al. ..... 715/205
6,961,906 B2 * 11/2005 Hansen et al. ..... 715/767
7,039,872 B1 * 5/2006 Raheman ..... 715/748
7,047,502 B2 * 5/2006 Petropoulos et al. ..... 715/781
2002/0129051 A1 * 9/2002 Abdelhadi et al. ..... 707/501.1
2002/0163545 A1 * 11/2002 Hii ..... 345/838
2003/0115546 A1 * 6/2003 Dubey et al. ..... 715/501.1
2004/0133848 A1 * 7/2004 Hunt et al. ..... 715/500
2006/0074869 A1 * 4/2006 Rosenberg et al. ..... 707/3

OTHER PUBLICATIONS

Harper et al.; "Middleware to Expand Content and Preview in Hypertext;" ACM; 2004; pp. 63-70.*
Bieber et al.;"Designing Hypertext Support for Computational Applications;" ACM; 1995; pp. 99-107.*
Witt et al.; "Reducing Cognitive Overhead on the World Wide Web;" 2001; Australian Computer Society; pp. 311-320.*
Chigona et al.; "Contextualized Preview of Image Map Links;" ACM; 2002; pp. 150-158.*
Kandogan et al.; "Elastic Windows: A Hierarchical Multi-Window World-Wide Web Browser;" 1997; ACM; pp. 169-177.*

* cited by examiner

*Primary Examiner* — Doug Hutton, Jr.
*Assistant Examiner* — Andrew R Dyer

(57) ABSTRACT

A method, system and apparatus for previewing documents on a computer system, the method comprising the steps of:—displaying a main document (102) which contains a hyperlink (104); and—in response to an indication (106) of the hyperlink being received by the computer system, displaying a preview document (108) which document being that referred to by the hyperlink whilst retaining the display of the main document, so that the document referred to by the hyperlink may be previewed.

30 Claims, 4 Drawing Sheets

PREVIEWING DOCUMENTS ON A COMPUTER SYSTEM

Matter enclosed in heavy brackets [ ] appears in the original patent but forms no part of this reissue specification; matter printed in italics indicates the additions made by reissue.

The present invention relates to a method and apparatus for previewing documents and in particular documents hyperlinked from other documents.

With the advent of electronic document publishing, documents are able to refer to other documents by embedding a hyperlink within the document. A user reviewing such a document using a personal computer or similar user terminal can access the referred document by selecting ('clicking') the hyperlink. Typical examples of such documents are Web pages, word-processed reports, spreadsheets, presentations and so on.

One disadvantage is that the hyperlink necessarily represents only a rudimentary indicator of content of the document it links to. For example, consider a Web page generated by a search engine comprising a set of search results which are presented to the user as a document containing a list of hyperlinks. The user knows the type of information he/she is seeking; unfortunately the description of the link, for example a textual extract taken out of context from the linked document, or just the URL, gives little clue to the user as to whether or not the link contains (or leads to) the desired information.

A standard method typically employed to access a document hyperlinked within a present document involves the user first selecting the hyperlink, then the present document is erased and replaced by the linked document. Where, after examination, the linked document is not what is required by the user, the user has then to return to the previous document. In the case of Web browsing this can incur delay and added cost as the prior document may have to be re-downloaded from the remote Web server. U.S. Pat. No. 5,933,142 assigned to Sun Microsystems, Inc. proposes a method whereby a user can preserve a current Webpage to persist on screen whilst also acquiring a succeeding Webpage linked from the current page. However, the method requires the user to manually invoke and cancel the persistence feature by means of a virtual 'push-pin'.

Another problem when following links between Web pages (Web 'surfing') is for the user to remain focused on his/her original objective. As the user accesses each new Web page he/she is forced to (a) leave the context of a preceding page and (b) make the next decision of which link to follow from within the choices (links) presented by the new page. It is easy to get distracted by having to consider various unexpected options at each new page; this problem is especially acute when a Website contains a link to a different Website thus forcing the user to leave the context of a Website completely. As the user links from one page to another a history file may be assembled comprising very limited textual information related to the hyperlink text or URLs. It is not easy for a user to backtrack along such a list of past links to identify the page from where he/she started or where he/she recalls seeing a link that he/she would now like to follow.

A further general problem is that present methods require the user to choose which links to follow in order to get the information necessary to decide which are the correct links to follow. Such contradictory methodology mandates provision of a means to allow a user to change his/her mind; present applications, be they Web browsers or word processors or the like, provide inadequate and non user friendly means to do this resulting in user inconvenience and confusion.

It is an object of the present invention to solve these and other problems by means of an improved method, system and apparatus to preview documents.

In accordance with the present invention there is provided a method for previewing documents on a computer system comprising the steps of:

displaying a main document which contains a first hyperlink; and in response to an indication of the first hyperlink being received by the computer system, displaying a first preview document which document being that referred to by the first hyperlink whilst retaining the display of the main document, so that the document referred to by the first hyperlink may be previewed.

In a typical computer system a document is presented to a user of the system by means of a screen display. If a document contains hyperlinks the user is able to identify and/or indicate a hyperlink to the computer system by means of any suitable input device, including, but not limited to, keyboard, mouse or touchscreen. Preferably, the input device is a screen pointer for example, manipulated by means of a mouse. In one embodiment of the present invention the user indicates a hyperlink to the computer system by positioning the pointer over the hyperlink. However, the user does not select the link (for example by 'left clicking' the mouse); instead the computer system automatically acquires the linked document and displays it on the screen in addition to the original document. In this way the user can preview the content of the link without actually selecting the linked document. This aspect is particularly valuable for Web browsers in that page specific controls (e.g. the toolbar buttons) still relate to the original document rather than the preview document. To cancel the display of the preview document the user may either stop indicating the hyperlink to the computer system or otherwise de-select the preview document. It should be noted that the method of the present invention is compatible with contemporary operating systems such as Microsoft® Windows®. In particular, the display of the preview document may be rendered by means of such a 'window'; in this case, standard Windows® positioning, sizing and document navigation features (i.e. scroll bars) can be provided to enable the user to manipulate the preview document.

In accordance with a further aspect of the present invention where a first preview document contains a hyperlink, the method further comprising the step of:

in response to an indication of the hyperlink being received by the computer system, displaying a second preview document which document being that referred to by the hyperlink whilst retaining the display of the first preview document, so that the document referred to by the hyperlink may be previewed.

The user may indicate to the computer system a hyperlink contained within a displayed preview document thereby requesting the display of a further preview document. In this way a sequence of preview documents may be displayed to the user, all stemming from a common main document. Preferably, each displayed document occupies a part of the display such that the user has an overview of at least a portion of each preview document and also the main document. In this way the user can easily visualise the path (document history) from the main document to the most recent preview document comprising all preview documents in between.

In accordance with a further aspect of the present invention where at least one preview document is displayed, the method of the invention further comprising the step of:

in response to an indication of a displayed document being received by the computer system, removing from display any and all preview documents deriving from the indicated document.

The user is able to indicate to the computer system a document from those currently displayed on the screen. The user may indicate the document using any suitable method, for example by positioning a pointer at a location in the displayed document where there is not a hyperlink. Preferably, the user positions a mouse pointer over such an area of the document to indicate it to the computer system. Once the document has been indicated, the document display automatically updates by removing all preview documents deriving from the indicated document. Preferably, the system arranges to cache such removed preview documents in case the user decides to preview them again; for example caching the last 6 or so documents.

In accordance with a further aspect of the present invention where a preview document is displayed, the method of the invention further comprising the steps of:

in response to a selection of a displayed preview document being received by the computer system, substituting the selected preview document for the main document; and removing from display all preview documents.

The user may select a preview document to be the main document. Selection may be by any suitable method, for example a user clicking a pointer at a location in the displayed preview document where there is not a hyperlink. Preferably, the user positions a mouse pointer over the preview document at such a location and 'left-clicks' thereby selecting the document. The selected document becomes the main document and all other documents are removed from the display. Similarly, should a user select a hyperlink within a displayed preview document then the document referred to by the hyperlink becomes the main document and all other documents are removed from the display. Preferably, where a mouse operated pointer is used, in order to reserve the familiar 'left-click' function for hyperlink or document selection, alternative means for resizing and/or repositioning the display of a preview document could be defined including, but not limited to, the use of short-cut keystrokes, function keys or the selection of specific symbols associated with the display of the preview document.

Clearly, the above method and features can be implemented by any computer system capable of simultaneously displaying a plurality of documents, for example where the documents are displayed in windows according to Microsoft® Windows® format.

Also in accordance with the present invention there is provided a system for displaying a preview document referred to by a hyperlink in a main document, the system comprising a workstation, a first document store containing a first preview document and an interconnection means; the workstation being operable to co-operate with the first document store using the interconnection means to access the first preview document and, in response to an indication of the hyperlink being received by the workstation, to display the first preview document in addition to displaying the main document.

Typical computer systems comprise workstations, storage means, servers and the like all interconnected using a variety of methods comprising any suitable bus or networking means (wired or wireless) or any combination thereof. Wired schemes include, but are not limited to, RS232, USB, Ethernet, IEEE1394/HAVi. Wireless schemes include, but not limited to, Bluetooth, IEEE802.11, ZigBee, HomeRF, other low power radio (e.g. 868 MHz, 915 MHz), IrDA. Documents to be previewed can reside in any storage means including, but not limited to, solid state memory, FDD, HDD, CD-ROM, DVD-ROM, server. Such storage may be termed a document store in the present invention; a document store can be located at any location accessible to a workstation of the system. Suitable locations are those local to the workstation (for example, a built-in HDD), those connected to a LAN (for example, a network drive) or those connected to a WAN (for example, an internet server). In another embodiment, the system may further comprise a server coupled to a second document store containing a second preview document, the server operable to co-operate with the workstation using the interconnection means, to access the second preview document in the second document store and to download the second preview document to the workstation. In general, the system will enable a workstation to be operable to access a plurality of preview documents contained in one or more document stores and to display at least one of said plurality of preview documents in addition to displaying the main document.

Also in accordance with the present invention there is provided a workstation comprising a display, data processing unit and user interface, operable according to the method of the invention to display preview documents. The workstation may also comprise a local document store, for example a FDD, HDD, CD-ROM, DVD-ROM from which to access a preview document. The workstation may alternatively, or in addition, interconnect with a remote document store and operable to access a preview document from said document store. Furthermore, the workstation may alternatively, or in addition, interconnect with a remote document server and operable to download a preview document from said document server. Means for interconnection to document stores and servers may utilise methods as discussed earlier and which are known to those skilled in the art. A workstation may further comprise a data store operable to cache the content and data associated with a preview document which has been removed from display, thereby allowing a user to quickly reinstate the display of the preview document. Preferably, the data store is operable to cache the content and data associated with up to 6 removed preview documents.

The invention is suitable to be applied to a range of common applications including, but not limited to, wordprocessors, spreadsheets, presentation tools (for example, Microsoft® PowerPoint) and Web browsers. An example embodiment is a Web browser application running on a computer system and displaying a main document, the application configured to be operable according to the method of the invention to display preview documents whilst also displaying the main document. An important advantage of the invention is that for the Web browser and other applications the main document remains controllable using the standard tools provided by the application.

Further features and advantages will now be described, by way of example only, with reference to the accompanying drawings in which.

In the present description the term 'hyperlink' (or 'link') denotes an active region embedded within an electronic document, for example a hypertext link. In the context of the present invention, the term should be construed to mean any displayable region of a document which when indicated or selected results in the information or document associated with that region being accessed. Where a region is a hyperlink, it references a document obtainable at the file location or URL described in the link. The term 'main document' denotes a document which is loaded in normal fashion within a host application (such as a word processor or Web browser). In the context of the present invention a main document contains at least one hyperlink referring to a document for which a preview display may be generated. The term 'FDD' means Floppy Disk Drive; the term 'HDD' means Hard Disk Drive; the terms 'CD-ROM' and 'DVD-ROM' should be construed as exemplary forms of disc based ROM (Read Only Memory) storage. The term 'document location' refers to any location at which a document resides, including, but not limited to, storage local to the users workstation (for example indicated by a local FDD, HDD, CD-ROM, DVD-ROM), a network pathname, or a file remote from the users workstation, for example a URL referencing a document residing on a remote Web server. The term 'preview document' denotes a document which is rendered in a preview display, which display is temporary in that the document is not loaded (for example, to be editable) as an instance within the host application. The term 'display' in relation to a document should be construed to mean the display of all, or a portion, of the content of said document.

Figure 1:
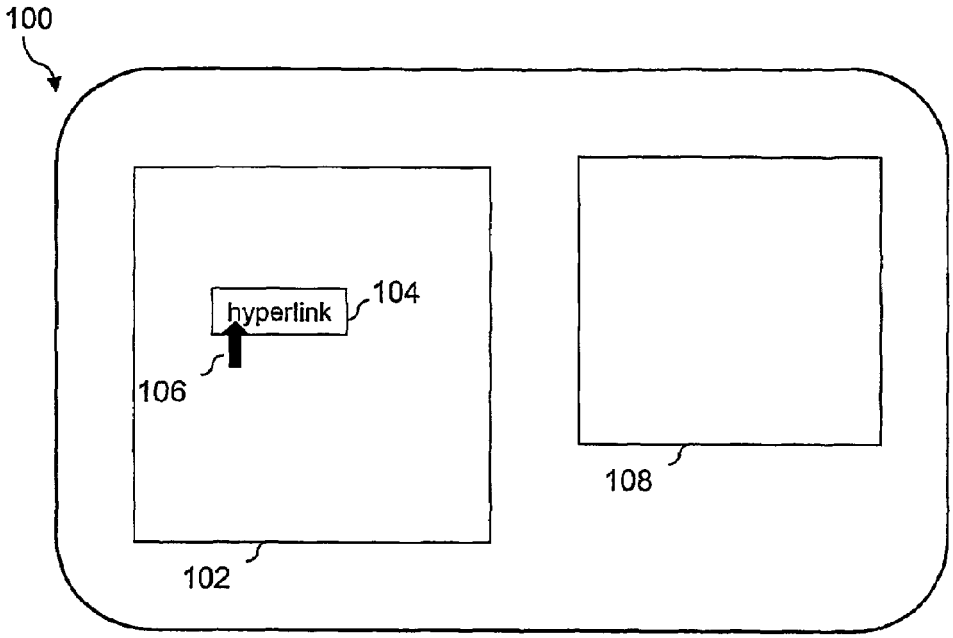
FIG. 1 is a schematic representation of an embodiment of the method of the present invention describing the previewing of a single document.

FIG. 1 shows a schematic representation of a method of embodying the present invention describing the previewing of a single document. The display screen 100 of a computer terminal depicts a main document 102 containing a hyperlink 104. The user positions a pointer 106 to be over the hyperlink. This action indicates to the underlying computer system that a preview of the document referred to by the hyperlink is required. The computer system then arranges for the document referred to by the hyperlink to be displayed as a preview document 108. It is to be noted that the hyperlink was not selected by the user, but instead just indicated to the computer system (in this case by positioning a pointer over the hyperlink, although any other method of indicating the hyperlink including, but not limited to, highlighting, code entry via keyboard, right-hand mouse click, is also suitable). Preferably, there would be a short delay between indicating the hyperlink and invoking the display of the preview document for example by dwelling the pointer over the hyperlink for a short period—this procedure could then act as a confirmation that the preview was required.

Figure 2:
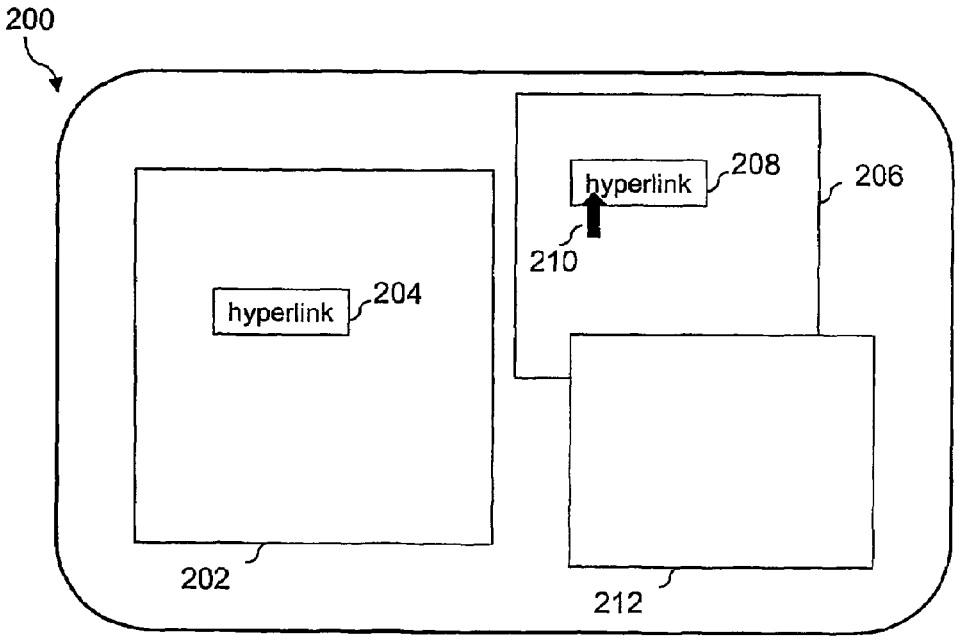
FIG. 2 is a schematic representation of an embodiment of the method of the present invention describing the previewing of multiple documents.

FIG. 2 shows a schematic representation of a further method of embodying the present invention describing the previewing of multiple documents. The scenario depicted follows on from that described in FIG. 1 in that a first preview document 206 is displayed on screen 200 of a computer terminal being the document referred by hyperlink 204 in the main document 202. The first preview document also contains a hyperlink 208 and the user positions a pointer 210 over this hyperlink. As discussed earlier, this action indicates to the underlying computer system that a preview of the document referred to by the hyperlink 208 is required. The computer system arranges for the display of a second preview document 212 being the document referred to by hyperlink 208. In this way a series of preview documents may be displayed each spawned from a prior document containing a hyperlink. Preferably, if utilising a pointer, whenever a preview document is first displayed the pointer is then repositioned within the display region of the preview document and at a position where there is not a hyperlink. For example, in a Microsoft® Windows® format application, suitable locations to position the pointer include, but are not limited to, the title bar or whitespace in the document display area.

Figure 3:
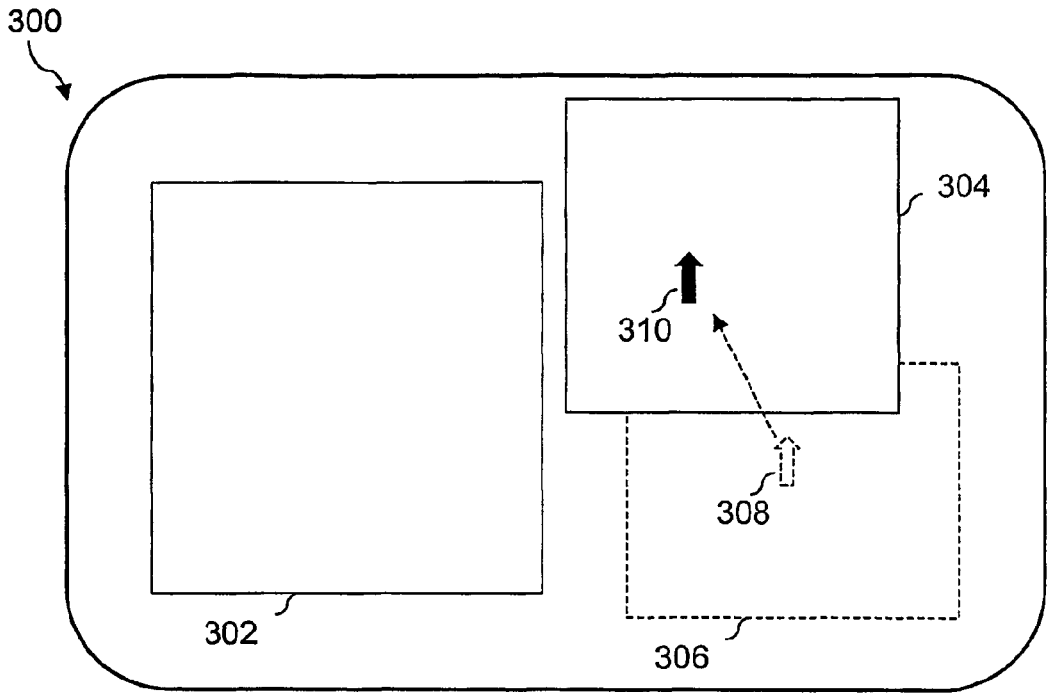
FIG. 3 is a schematic representation of an embodiment of the method of the present invention describing the cancellation of a preview document.

FIG. 3 shows a schematic representation of a further method of embodying the present invention describing the cancellation of a preview document. The display screen 300 of a computer terminal depicts a main document 302 from which has been derived a first preview document 304 and from which, in turn, has been derived a second preview document 306 using hyperlinks (however, for clarity, the hyperlinks are not shown in FIG. 3), as described earlier. The present position of the pointer is at 308 such that it is lying within the display region of the second preview document 306. The user elects to reposition the pointer to position 310, which position is (a) outside the display region of second preview document 306 and (b) within the display region of first preview document 304. This repositioning of the pointer acts as an indicator to the underlying computer system that the user requires removal from the display of the second preview document 306 (as denoted by the dashed outline) and the retention of the display of the first preview document 304. Clearly the pointer can be positioned in a range of locations within the display area of the display screen, as determined by the host application; which (if any) preview document is removed from the screen is dependent on the actual positioning of the pointer, or other method of indication, as discussed above. Placing the pointer outside the display region of any preview document on the screen will have the effect of removing all preview documents from the screen leaving just the main document displayed. Preferably, a short delay is desirable before removing a preview document display; alternatively, or in addition, caching the content of a preview document would allow rapid re-display of a preview document for a user who changes his/her mind after having removed the preview document from the display.

Figure 4:
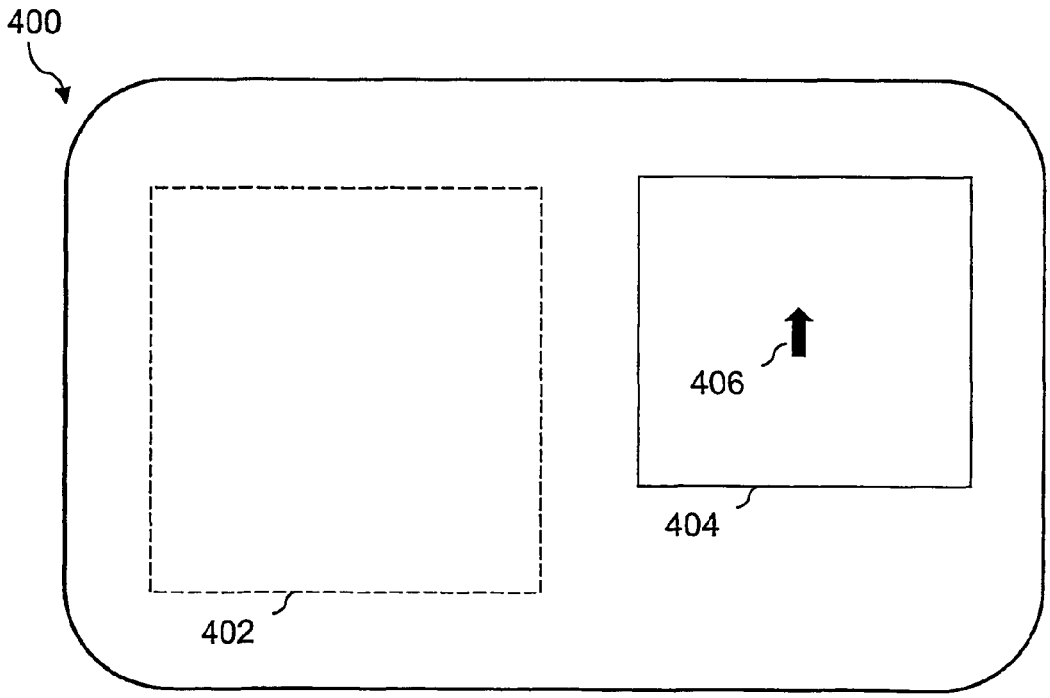
FIG. 4 is a schematic representation of an embodiment of the method of the present invention describing the replacement of a main document by a preview document.

FIG. 4 shows a schematic representation of a further method of embodying the present invention describing the replacement of a main document by a preview document. The display screen 400 of a computer terminal depicts a main document 402 from which has been derived a preview document 404 (for clarity, the hyperlink in the main document is not shown). Pointer 406 is lying within the display region of the preview document 404. Selecting the preview document (for example by clicking the pointer at the current position, at which position there is not a hyperlink) will make the preview document now become the main document (and optionally re-rendered on the display, for example to become a larger display region); all other documents will be removed (in this present example just the main document), as is denoted by dashed outline of the main document 402.

The method of the invention may be implemented for specific applications (for example word processors, spreadsheets, Web browsers and the like) in accordance with standard facilities commonly available for adapting such applications. The following describes an example of an implementation of the method for a Windows®-based Web browser application. Such an application may have an Application Programming Interface (API) implemented either using a Plug-in program module or an Active-X object; the internal operations performing the method of the invention will be consistent in either case. This example uses a pointer controlled by a mouse. Pointer activity is managed using an event (or even signal) handler program; either mechanism may be used to manage activities that are triggered by some external stimulus (be it a pointer entering, selecting or exiting a context sensitive object, or some other user input). The operating system may provide the handler mechanism and a variety of standard input stimuli that can be assigned to a handler. It may also be possible for the designer to create and assign additional input stimuli for the handlers, including, but not limited to, keyboard, touchscreen or touchpad. The operating system passes control to an assigned handler when it detects an associated input stimulus. It is up to the handler as to how it processes and responds to the input.

The method of the invention may be implemented using one or more such handlers. These handlers might manage the acquisition, display rendering and removal of preview documents by calling standard utility program modules. If required, the handlers might also include timers to manage the response of the system to various events, for example to delay rendering the display of a preview document depending on the user dwelling the mouse pointer over a hyperlink for a minimum period of time.

The implementation also monitors which preview documents are displayed by using a data structure to record the detail of each preview document display (e.g. window ID, size, screen location, document file location (path, URL), etc.). All current data structures (for example those relating to preview documents presently displayed) are linked together into a list, with the first preview document display at the head of the list and the last (most recent) preview document display at the tail of the list. As the pointer moves out of the display region of a preview document display and into the display region of a preceding preview document display, all subsequent (derived) preview document displays in the list are removed (i.e. they are not displayed and the link list is modified accordingly). It should be noted that the data corresponding to a removed preview document display (that is the data structure and also the content of the document) may be retained to allow rapid re-rendering of the preview document display should the user subsequently wish to preview the document once again. Where the pointer is moved out of the display region of any preview document display then all preview document displays are removed (but again any of the preview documents content, data structures or the link-list may be retained for subsequent re-use where the user desires to preview the documents again).

Furthermore, it should be apparent to the skilled reader that the foregoing method does not impact the normal operation of the application in respect of the main document, since the preview documents are rendered without altering the status of the main document as viewed by the application in which it is loaded. Taking as an example a Web browser, the toolbar(s) of the browser window relate exclusively to the main document, and not to any preview document displayed, such that any invocation thereof will solely affect the main document; for instance, pressing the 'Back' button will replace the present main document with the immediately preceding main document.

In the case of the present example which utilises a mouse controlled pointer as the input device, a number of handlers could be defined to respond to the input events associated with the method of the invention as described in the following.

In the event that the pointer enters the region of a hyperlink in a displayed document, a handler could be activated which would request acquisition of the document referred to by the hyperlink and organise the preview display of the document, optionally after a short delay (pointer dwell) period acting as a confirmation by the user that the preview is required; should the pointer exit the region of the hyperlink before the delay period expires then the handler aborts and the preview document is not displayed. Where the preview document is displayed the handler will arrange for the updating of the data structure and link-list entry associated with the preview document and also, optionally, reposition the pointer to reside within the preview document display region (suitably at a position where there is not a hyperlink).

In the event that the pointer exits the displayed region of a previewed document, a handler would be activated which would arrange for the removal from the display of the preview document (plus the removal of any other preview documents in dependence on the position of the pointer). The handler would preferably arrange to retain the content and data associated with the removed document(s) for possible subsequent re-use.

Finally, in the event that the user selects (e.g. by left clicking the mouse) a document referred to by a hyperlink or a preview document, a handler would be activated which would arrange to make the selected document the main document and remove all other documents associated with the original main document from the display.

Figure 5:
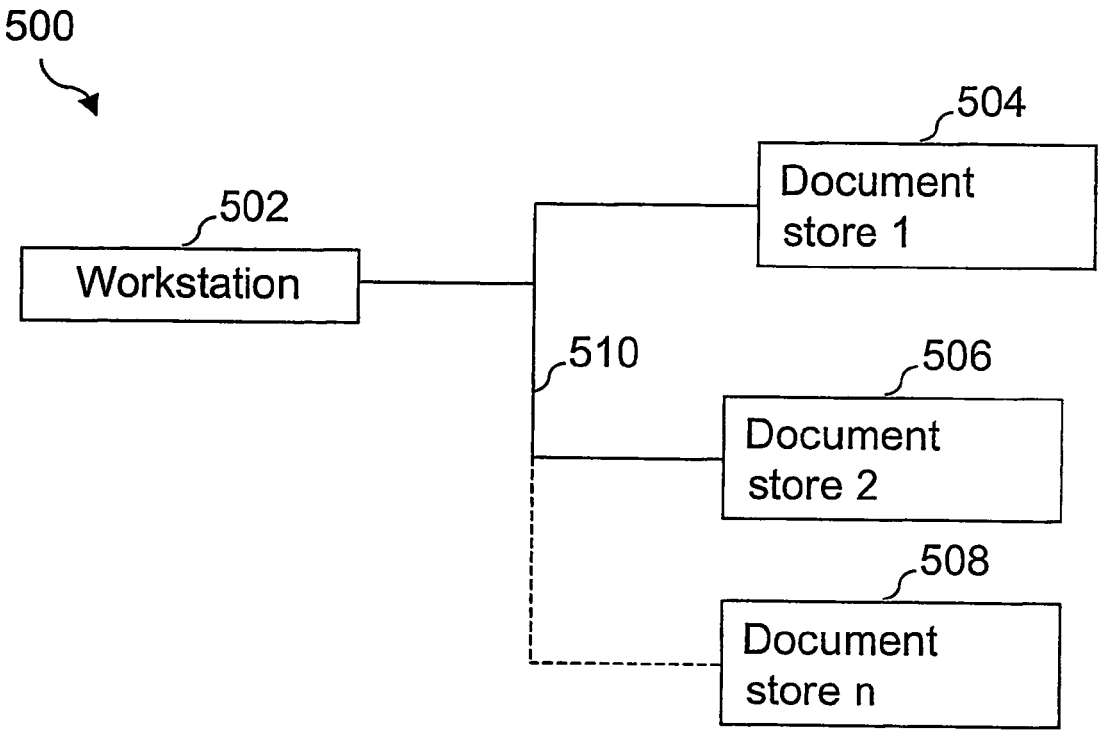
FIG. 5 is a schematic representation of an embodiment of the system of the present invention.

FIG. 5 shows a schematic of an embodiment of the system of the present invention. The system, shown generally at 500, comprises a workstation 502, a first document store 504, a second document store 506 and an nth document store 508 all interconnected by means 510. The system may comprise any number of document stores, implemented using solid state memory, FDD, HDD, CD-ROM, DVD-ROM, as discussed earlier and use one or more means of interconnection also as discussed earlier. The system can be viewed logically in that a main document (containing a first hyperlink) is loaded into an application (configured according to the invention) running on the workstation and displayed on the VDU (not shown in FIG. 5) of the workstation. Indication of the first hyperlink causes the application to instruct the workstation to access a first preview document from the first document store 504 via interconnection means 510. The first preview document is displayed on the VDU; the first preview document contains a second hyperlink, the indication of which in turn causes the application to instruct the workstation to access a second preview document from the second document store 506 via interconnection means 510. So the process continues until the nth hyperlink, the indication of which in turn causes the application to instruct the workstation to access a nth preview document from the nth document store 508 via interconnection means 510. Clearly, the various document stores described may be physically separate stores or some may be combined thereby sharing the same physical store. A document store may reside locally with respect to the workstation or remotely within a network server or internet server or be accessible by the workstation via one or more such servers.

Figure 6:
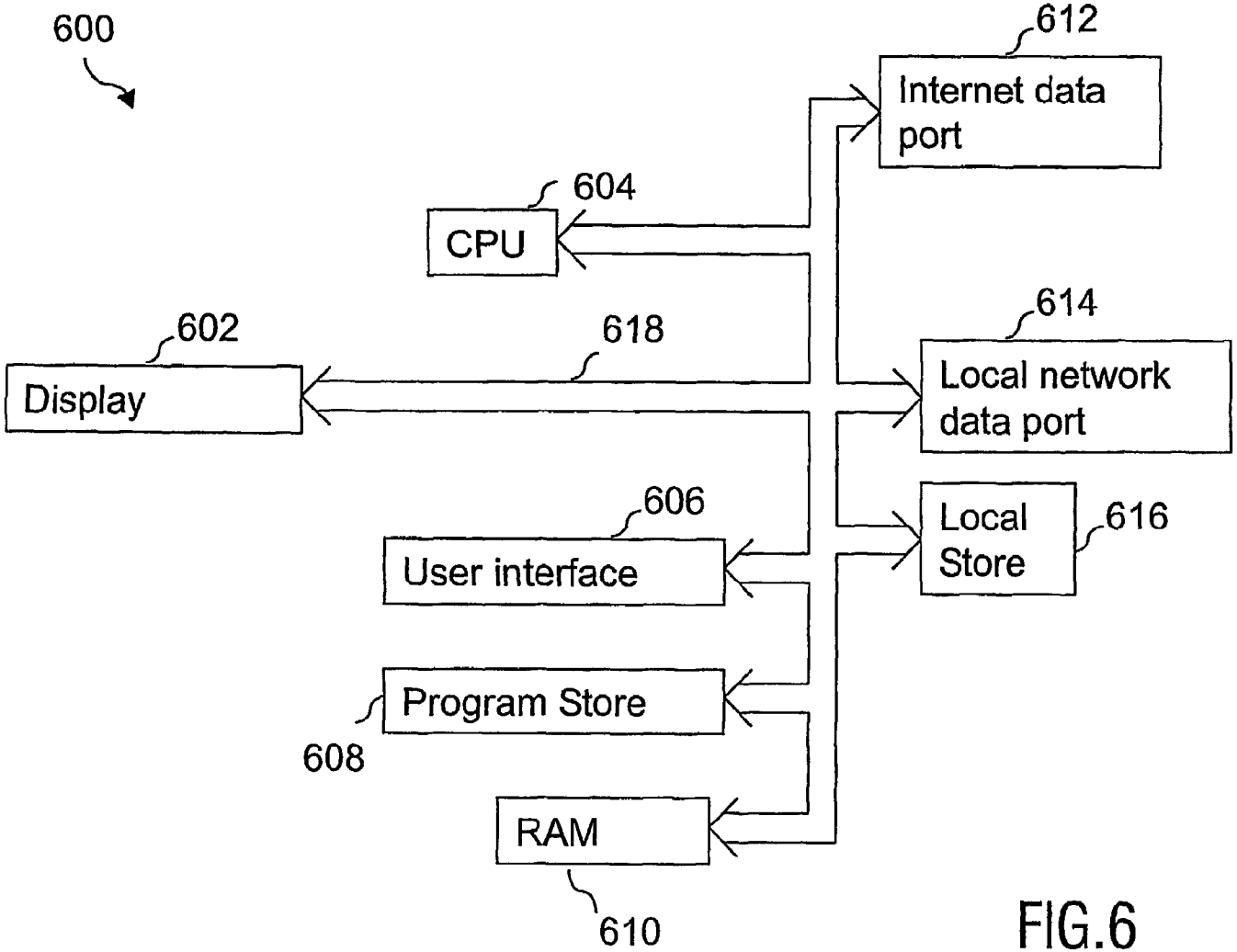
FIG. 6 is a schematic representation of an embodiment of the workstation of the present invention.

FIG. 6 shows a schematic of an embodiment of the workstation of the present invention. The workstation, shown generally at 600, comprises a display 602, CPU 604, user interface 606, program store 608, RAM 610, internet data port 612, LAN data port 614 and local document store 616 all interconnected via bus 618. An application (e.g. a Web browser) suitably configured to be operable according to the method of the invention is stored in program store 608. In operation, the application is run by the CPU 604 using convention means as is known in the art. A main document may be obtained from the local store 616 or downloaded via the LAN port 614 or internet port 612. The main document is displayed on the display 602 under control of the application. When a user wishes to preview a document (indicating by means of user interface 606 a hyperlink within the main document), the application will decode the location and document identity given by data associated with the hyperlink and endeavour to access the document at the given location via the local store 616, the LAN port 614 or internet port 612, as appropriate. Once acquired, the preview document is then rendered on the display 602 as discussed earlier and temporarily stored in RAM 610. The user may preview another document by either cancelling (removing from the display) the present preview document and then indicating an alternative hyperlink within the main document, or by indicating a hyperlink within a presently displayed preview document. By indicating links in successive preview documents a series of such documents can be displayed in addition to the main document; a user may also backtrack through such a series to an earlier preview document and indicate a different hyperlink within that preview document thereby establishing an alternative path (series) of preview documents stemming from that preview document.

The foregoing implementation is presented by way of example only and represents one of a range of implementations that can readily be identified by a person skilled in the art to exploit the advantages of the method as disclosed in the present invention.

In the description above and with reference to FIG. 1, a method, system and apparatus for previewing documents on a computer system is described, the method comprising the steps of:

displaying a main document 102 which contains a hyperlink 104; and in response to an indication 106 of the hyperlink being received by the computer system, displaying a preview document 108 which document being that referred to by the hyperlink whilst retaining the display of the main document, so that the document referred to by the hyperlink may be previewed.

The invention claimed is:

1. A method for previewing documents on *a display of* a computer system, *the method* comprising the steps of:

displaying a main document which contains a first hyperlink;

displaying a first preview document, which is referred to by said first hyperlink, in response to an indication of said first hyperlink, whilst retaining said display of the main document, wherein said first preview document contains a second hyperlink;

displaying a second preview document, which is referred to by said second hyperlink, in response to an indication of said second hyperlink whilst retaining said display of said first preview document and said display of said main document, wherein indicating each hyperlink to the computer system by positioning a pointer over the hyperlink;

wherein each preview document is opened in a corresponding preview window, [wherein] when each preview document is opened, the pointer automatically moves to within the newly opened preview window, [wherein] said first preview document window remains open as long as the pointer remains in said second preview document window or a window corresponding to a subsequent preview document derived via a subsequent hyperlink in said second preview document, [wherein] when the pointer is moved from the second preview document window to the first preview document window, the second preview document window closes, [wherein] when the pointer is moved to a region not in said first preview document window or said second preview document window, or a window corresponding to a subsequent preview document derived via a subsequent hyperlink in said second preview document, both the first and second preview document windows close.

2. [A] *The* method according to claim 1, further comprising the step of:

in response to an indication of [a] *the* displayed document being received by the computer system, removing from *the* display [any and] all *displayed* preview documents deriving from the indicated document.

3. [A] *The* method according to claim 2, further comprising the step of[:] caching a preview document which has been removed from display.

4. [A] *The* method according to claim 2, wherein the document is indicated by positioning the pointer at a location in the displayed document [where there is not] *without* a hyperlink.

5. [A] *The* method according to claim 1, further comprising the steps of:

in response to a selection of a displayed preview document being received by the computer system, substituting the selected preview document for the main document;

and removing from display all preview documents.

6. [A] *The* method according to claim 5, wherein the preview document is selected by clicking a pointer at a location in the displayed preview document where there is not a hyperlink.

7. [A] *The* method according to [any preceding] claim *1*, wherein *the* documents are displayed in windows according to [Microsoft.RTM Windows.RTM.] *an industry* format.

8. [A] *The* method according to claim 5, further comprising the step of: caching a preview document which has been removed from display.

9. [A] *The* method according to claim 1, wherein the second hyperlink is indicated to the computer system by positioning the pointer over the second hyperlink.

10. A workstation comprising a display, data processing unit and user interface, operable according to the method of claim 1 to display preview documents.

11. [A] *The* workstation as claimed in claim 10, further comprising a local document store, the workstation being operable to access a preview document from said document store.

12. [A] *The* workstation as claimed in claim 10, further comprising a data store operable to cache the content and data associated with a preview document which has been removed from display.

13. A Web browser application running on a computer system and displaying a main document, the application configured to be operable according to the method of claim 1 to display preview documents whilst also displaying the main document.

14. [A] *The* Web browser application as claimed in claim 13 wherein the main document is controllable using at least one tool provided by the application.

15. A system for displaying preview text and spreadsheet documents referred to by a link in a main document, the system comprising:

a local network containing one or more document stores[; wherein], said one or more document stores [contains] *includes* said preview text and said spreadsheet documents; *and* a plurality of workstations connected to the local network, [wherein] each workstation being operable to store the preview text and the spreadsheet documents in said one or more document stores[;],

[wherein] each workstation being operable to access the preview text and the spreadsheet documents that are stored within said one or more document stores, in response to the link referred to said preview text or said spreadsheet document being indicated in the main text or the spreadsheet document currently displayed on the workstation[;],

[wherein] each workstation being operable to display a preview of said text or said spreadsheet document referred to by the link indicated in the main text or the spreadsheet document in whilst displaying the main text or the spreadsheet document[;], wherein the link referring to said text or said spreadsheet document is indicated to the workstation by positioning a pointer over the link[; wherein],when each preview document is opened, the pointer automatically moves to within the newly opened preview window.

16. [A] *The* system as claimed in claim 15, further comprising a local server coupled to the one or more document stores.

17. A method of browsing internet websites comprising:

(a) in response to placing a pointer over a URL reference or symbol of a current web page, displaying a pop-up preview-window also having a URL reference or symbol;

(b) in response to placing the pointer over the URL reference or symbol of said pop-up preview-window, displaying a child pop-up preview-window, whilst retaining display of said current web page;

(c) repeating step (b) to generate a plurality of child preview windows; and wherein when a new preview window is displayed, the pointer is automatically repositioned within the new preview window.

18. The method according to claim 17, further including in response to moving the pointer out of the new preview window back to a previous preview window, removing the new preview window.

19. The method according to claim 17, further including in response to moving the pointer out of the new preview window to a previous preview window, removing all preview windows that are subsequent to the previous preview window.

20. The method according to claim 17 wherein step (c) further includes:

after displaying the child pop-up preview window, placing the pointer over a URL reference or symbol in the child preview window to generate a second generation child preview window, the pointer being automatically repositioned within the second generation preview window;

placing the pointer over a URL reference or symbol in the second generation child preview window to generate a third generation child preview window, wherein the pointer being automatically repositioned within the third generation preview window, whilst the first preview window, the child preview window, the second generation child preview window and the third generation child preview window all continuing to be at least partially displayed.

21. The method according to claim 20 further including:

a) in response to moving the pointer from within the third generation child preview window to the second generation child preview window, closing the third generation child preview window;

b) in response to moving the pointer to within the child preview window, closing the second and third generation preview windows;

c) in response to moving the pointer to within the first preview window, closing the child, second generation child, and third generation child preview windows;

d) in response to moving the pointer to a location in none of the preview windows, closing all of the preview windows.

22. The method according to claim 17, further including displaying one of the preview windows as a current page in response to clicking on the specific preview window and removing all other preview windows from the display.

*23. A method for controlling selection of an active document from a plurality of documents having one or more hyperlinks referring to other documents of the plurality of documents, by a computer system having a screen display and at least one input device, the method comprising acts of:*

*displaying on the screen display only a plurality of preview windows including an active preview window, each displayed preview window respectively associated with each of the plurality of documents referred to by hyperlinks of the document included in the active preview window, each preview window occupying a part of the screen display such that the user has an overview of at least a portion of each preview window;*

*recording details of each preview window;*

*selecting one of the displayed preview windows using the input device; and*

*designating the document associated with the selected preview window to be the active document*

*wherein a pointer of the at least one input device provided by the computer system automatically moves to within the preview window opened last, the preview window opened last and all preceding preview windows remain open while the pointer remains within the preview window opened last.*

*24. The method of claim 23, wherein the input device is selected from a keyboard, mouse, or touch screen.*

*25. The method of claim 23, further comprising an act of caching unselected preview windows in case the user decides to preview the documents associated with the unselected preview windows.*

*26. The method of claim 23, wherein the preview windows reside on storage means selected from at least one of solid state memory, FDD, HDD, CD-ROM, DVD-ROM, networked servers.*

*27. The method of claim 26, wherein the details of preview windows are selected from at least one of window ID, window size, window screen location, and associated document file location.*

*28. The method of claim 27, wherein the location of the documents file is provided by its disk path and network URL.*

*29. The method of claim 23, wherein all displayed preview windows are linked together in a list with a first displayed preview window starting the list and a last displayed preview window ending the list.*

*30. A method for controlling selection of an active document from a plurality of documents, each document having one or more hyperlinks referring to other documents, by a*

*computer system having a screen display and at least one input device, the method comprising acts of:*

*displaying on the screen a plurality of preview windows including an active preview window, each displayed preview window associated with one or more hyperlinks referring to other documents, each preview window occupying a part of the screen display such that the user has an overview of at least a portion of each preview window;*

*selecting one of the displayed preview windows using the input device; and*

*designating the selected preview window or a document related to a hyperlink in the selected preview window to be the active document,*

*wherein a pointer of the at least one input device provided by the computer system automatically moves to within the preview window opened last, the preview window opened last and all preceding preview windows remain open while the pointer remains within the preview window opened last.*

* * * * *